United States Patent
Kawashima

(10) Patent No.: US 10,965,669 B2
(45) Date of Patent: Mar. 30, 2021

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Yasuaki Kawashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 16/145,488

(22) Filed: Sep. 28, 2018

(65) Prior Publication Data

US 2019/0109844 A1 Apr. 11, 2019

(30) Foreign Application Priority Data

Oct. 5, 2017 (JP) .............................. JP2017-195380

(51) Int. Cl.
 *H04L 29/06* (2006.01)
 *G06F 21/60* (2013.01)
 *G06F 21/31* (2013.01)

(52) U.S. Cl.
 CPC .......... *H04L 63/0853* (2013.01); *G06F 21/31* (2013.01); *G06F 21/608* (2013.01); *H04L 63/083* (2013.01)

(58) Field of Classification Search
 CPC ... H04L 63/0853; H04L 63/083; G06F 21/31; G06F 21/34; G06F 21/608
 See application file for complete search history.

(56) References Cited

U.S. PATENT DOCUMENTS

| | | | |
|---|---|---|---|
| 9,798,869 B2 | 10/2017 | Suzuki | |
| 9,912,578 B2 | 3/2018 | Kawashima | |
| 10,460,088 B2* | 10/2019 | Oka | G06F 3/0622 |
| 2011/0261386 A1* | 10/2011 | Kasuya | G06F 21/608 |
| | | | 358/1.14 |
| 2012/0096530 A1* | 4/2012 | Hirose | G06F 21/31 |
| | | | 726/7 |
| 2015/0172267 A1* | 6/2015 | Sato | H04L 63/08 |
| | | | 726/3 |
| 2016/0004851 A1* | 1/2016 | Suzuki | G06F 21/31 |
| | | | 726/7 |
| 2016/0337531 A1* | 11/2016 | Masui | H04N 1/00411 |
| 2016/0337553 A1* | 11/2016 | Sato | H04N 1/4413 |
| 2017/0013161 A1 | 1/2017 | Kawashima | |
| 2017/0286028 A1* | 10/2017 | Yang | G06F 3/1238 |
| 2018/0004922 A1 | 1/2018 | Suzuki | |
| 2018/0041658 A1 | 2/2018 | Kawashima | |
| 2018/0083943 A1* | 3/2018 | Bowman | H04L 67/18 |

FOREIGN PATENT DOCUMENTS

JP 2016015694 A 1/2016

* cited by examiner

*Primary Examiner* — Malcolm Cribbs
(74) *Attorney, Agent, or Firm* — Venable LLP

(57) ABSTRACT

An MFP (communication apparatus) accepts, as an operation for making an electronic data transmission destination setting, an operation using a local UI (LUI) or a remote UI (RUI). The MFP, in accordance with an accepted operation, logs in to an LDAP server (server apparatus), and performs obtainment processing for obtaining a transmission destination from the server. If logging in to the LDAP server in accordance with an operation using the LUI in the obtainment processing, the MFP uses authentication information stored in an HDD, and if logging in to the LDAP server in accordance with an operation using the RUI, the MFP does not use authentication information stored in the HDD.

11 Claims, 16 Drawing Sheets

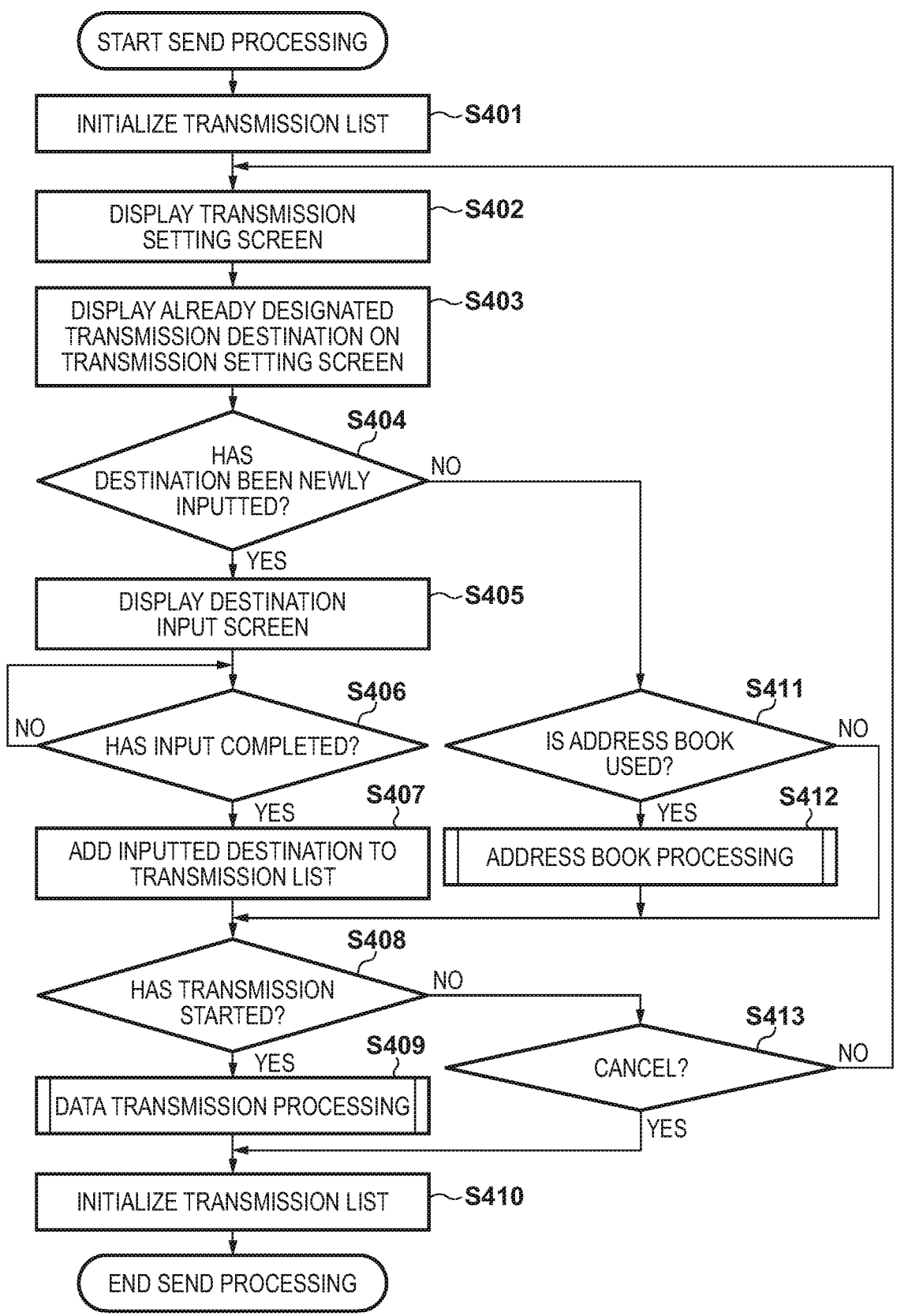

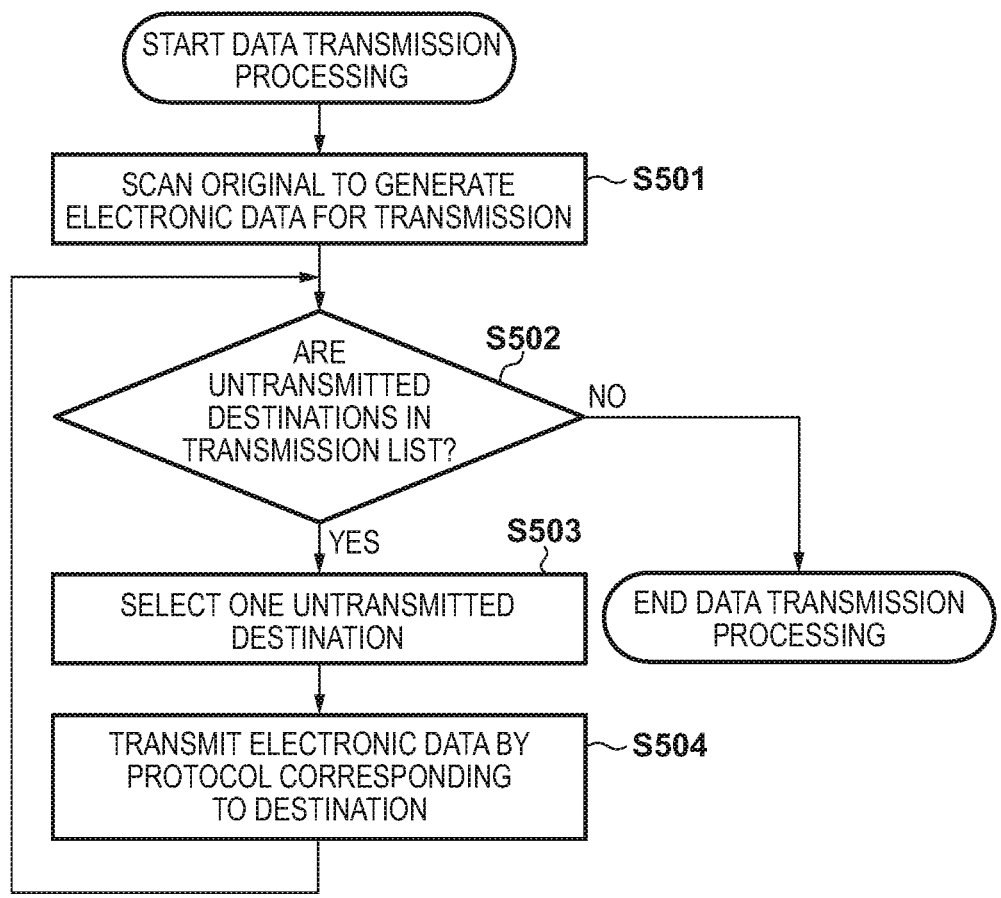

F I G. 12A

| | TYPE | TITLE | DESTINATION |
|---|---|---|---|
| ✓ | FILE | PC3 | \\PC3\smb |

ID: UserA

NUMBER OF SELECTED DESTINATIONS: 1

CANCEL     OK

F I G. 12B

ID: UserA

<EMAIL>
INPUT EMAIL ADDRESS

EMAIL ADDRESS: xxx@yyy

DATA DIVISION     ON     OFF

CANCEL     OK

COMMUNICATION APPARATUS, METHOD OF CONTROLLING THE SAME, AND STORAGE MEDIUM

BACKGROUND OF THE INVENTION

Field of the Invention

The present invention relates to a communication apparatus, a method of controlling the same, and a storage medium.

Description of the Related Art

A communication apparatus such as a multi-function peripheral (MFP) that has a communication function typically has a local UI (user interface) that accepts operations made using an operation unit provided on the apparatus and a remote UI that accepts operations via a network from an external apparatus. It is possible to prevent improper use of the communication apparatus via the local UI by restricting entrance into the location at which the communication apparatus is installed, for example. Meanwhile, it is possible to prevent improper use of the communication apparatus via the remote UI by performing an authentication of a user who will use the communication apparatus, for example. In Japanese Patent Laid-Open No. 2016-15694, a technique is proposed in which, for each of the local UI and the remote UI, whether to authenticate is set individually.

There are cases in which the above-described communication apparatus has a function for cooperating with a server apparatus such as an LDAP server arranged within an intranet. In this case, when authentication information which is saved in the communication apparatus and which is for logging in to the server apparatus from the remote UI is available, there is the possibility that an improper access to the server apparatus from an external apparatus will be performed via the remote UI. Accordingly, there is the possibility that information (personal information of a user or the like) that the server apparatus is managing will leak.

SUMMARY OF THE INVENTION

The present invention was conceived in view of the above described issues. The present invention provides a technique for preventing a server apparatus from being accessed by using authentication information saved in a communication apparatus that can communicate with a server apparatus, via a remote UI of the communication apparatus.

According to one aspect of the present invention, there is provided a communication apparatus, comprising: a storage; an operation unit; a memory storing instructions, and at least one processor executing the instructions causing the information processing apparatus to: accept, as an operation for a setting related to a transmission destination of an electronic data, a first operation made using the operation unit; obtain, in accordance with the accepted first operation, authentication information stored in the storage to log in to the server apparatus; perform a control to log in to the server apparatus by using the obtained authentication information; obtain information of the transmission destination from the server apparatus; accept, as the operation, a second operation made via a network from an external apparatus, and provide a screen for inputting authentication information to the external apparatus without obtaining of the authentication information stored in the storage in accordance with the accepted second operation.

According to another aspect of the present invention, there is provided a method of controlling a communication apparatus including a storage and an operation unit, the method comprising: accepting, as an operation for a setting related to a transmission destination of an electronic data, a first operation made using the operation unit; obtaining, in accordance with the accepted first operation, authentication information stored in the storage to log in to the server apparatus; performing a control to log in to the server apparatus by using the obtained authentication information; obtaining information of the transmission destination from the server apparatus; accepting, as the operation, a second operation made via a network from an external apparatus, and providing a screen for inputting authentication information to the external apparatus without obtaining of the authentication information stored in the storage in accordance with the accepted second operation.

According to still another aspect of the present invention, there is provided a non-transitory computer-readable storage medium storing a computer program for causing a computer to execute a method of controlling a communication apparatus including a storage and an operation unit, the method comprising: accepting, as an operation for a setting related to a transmission destination of an electronic data, a first operation made using the operation unit; obtaining, in accordance with the accepted first operation, authentication information stored in the storage to log in to the server apparatus; performing a control to log in to the server apparatus by using the obtained authentication information; obtaining information of the transmission destination from the server apparatus; accepting, as the operation, a second operation made via a network from an external apparatus, and providing a screen for inputting authentication information to the external apparatus without obtaining of the authentication information stored in the storage in accordance with the accepted second operation.

By virtue of the present invention it becomes possible to prevent a server apparatus from being accessed, by using authentication information saved in a communication apparatus that can communicate with the server apparatus, via a remote UI of the communication apparatus. Thereby, it is possible to prevent information that the server apparatus is managing from leaking via the remote UI.

Further features of the present invention will become apparent from the following description of exemplary embodiments (with reference to the attached drawings).

BRIEF DESCRIPTION OF THE DRAWINGS

FIG. 7 is a flowchart illustrating a procedure of SEND processing according to an embodiment.

FIG. 9 is a flowchart illustrating a procedure of data transmission processing according to an embodiment.

FIGS. 12A and 12B are views illustrating examples of operation screens related to the address book processing according to an embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<System Configuration>

Figure 1:
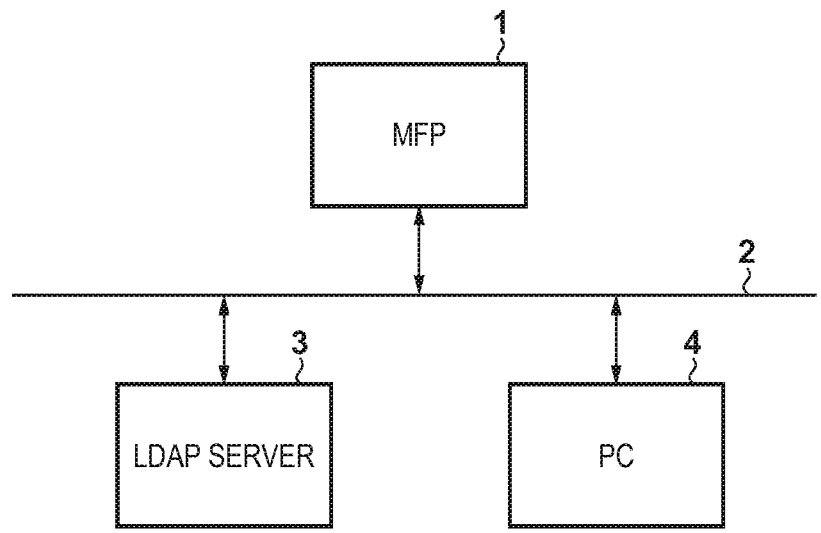
FIG. 1 is a block diagram illustrating a configuration of a communication system according to an embodiment.

FIG. 1 is a block diagram which illustrates a communication system configuration example according to the present embodiment. In FIG. 1, a communication system in which an MFP (multi-function peripheral) 1, an LDAP (Lightweight Directory Access Protocol) server 3, and a PC (personal computer) 4 are communicably connected via a network 2 is exemplified. The MFP 1 provides a remote user interface (abbreviated as "remote UI" or "RUI" hereinafter) for performing operation of the MFP 1 to an external apparatus such as the PC 4 via the network 2. A Web browser is installed on the PC 4. The PC 4 can use the RUI of the MFP 1 by accessing the MFP 1 by using the Web browser.

The LDAP server 3 manages a list of pieces of personal information such as email addresses, telephone numbers, and facsimile numbers that a user who logged in to the server can use. In the present embodiment, the LDAP server 3 at least manages a list of electronic data transmission destinations (transmission partners) usable in the MFP 1 for a SEND function that is described later. It becomes possible to use, in the MFP 1, information managed by the LDAP server 3 by logging in to the LDAP server 3 from the MFP 1. In the present embodiment, the MFP 1 is one example of a communication apparatus, and the LDAP server 3 one example of a server apparatus that can communicate with the MFP 1 (a communication apparatus) and manages electronic data transmission destinations. Also, the PC 4 is one example of an information processing apparatus that can communicate with the MFP 1 (communication apparatus).

<MFP Hardware Configuration>

Figure 2:
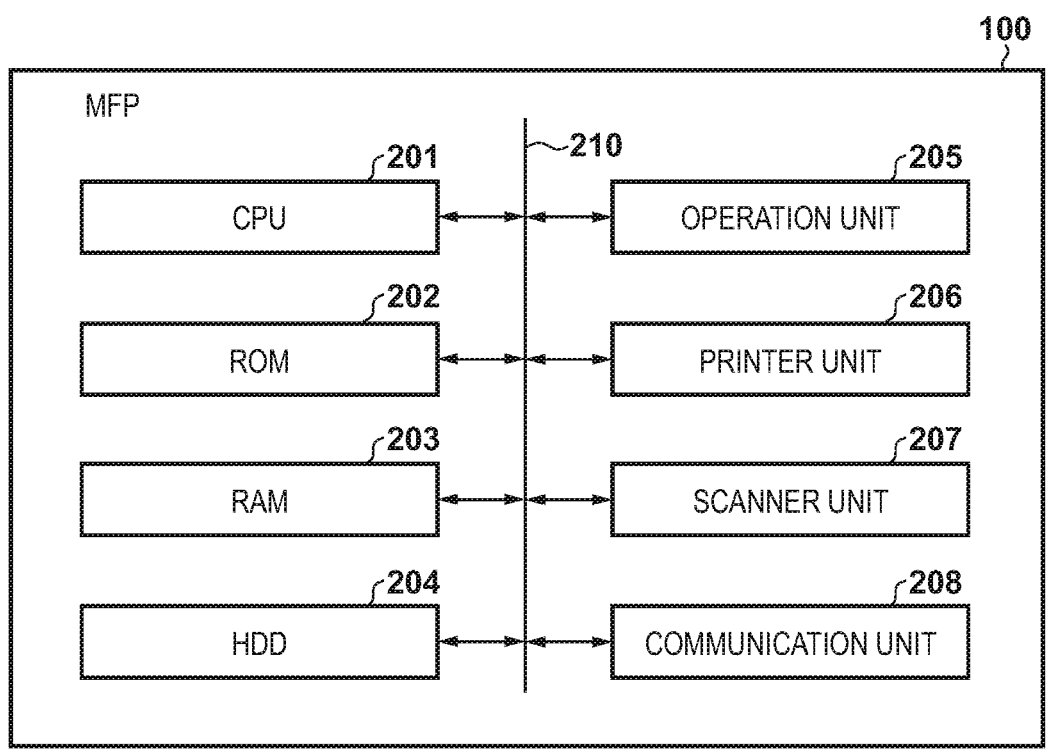
FIG. 2 is a block diagram illustrating a configuration of an MFP according to the embodiment.

FIG. 2 is a block diagram that illustrates one example of a hardware configuration of the MFP 1 illustrated in FIG. 1. The MFP 1 is equipped with a CPU 201, a ROM 202, a RAM 203, an HDD 204, an operation unit 205, a printer unit 206, a scanner unit 207, and a communication unit (communication interface) 208. These devices within the MFP 1 can communicate with each other via a system bus 210.

The CPU 201 controls operation of the whole MFP 1 by controlling each device connected to the system bus 210. The CPU 201 realizes various functions that the MFP 1 has such as a print function, a copy function, and a scanning function by reading and executing programs stored in the ROM 202 and the HDD 204. The RAM 203 is a volatile memory used as a temporary storage region such as a work area for the CPU 201 to execute various programs. Note that an example in which one processor (the CPU 201) executes each process (illustrated in each flowchart) described later is described in the present embodiment, but limitation is not made to this. For example, it is also possible that the MFP 1 be configured such that a plurality of processors (CPUs) cooperate to execute each process.

The HDD 204 is a non-volatile storage device that stores various programs and data. In the HDD 204, an address book in which transmission destinations for when the MFP 1 transmits electronic data are registered and information (LDAP server settings) relating to the LDAP server 3 with which the MFP 1 can communicate is stored. Authentication information comprising a user ID and PW for logging in to the LDAP server 3 is included in LDAP server settings as described later. In the present embodiment, the HDD 204 functions as one example of a storage unit in which authentication information for logging in to a server apparatus (the LDAP server 3) that manages electronic data transmission destinations is stored.

The operation unit 205 is equipped with a display having a touch panel function and may be further equipped with hardware keys such as a numeric keypad. A user can input instructions and information into the MFP 1 via the operation unit 205. The MFP 1 (the CPU 201) provides a local user interface (abbreviated as "local UI" or "LUI" hereinafter) of the MFP 1 by using the operation unit 205. The user can perform an operation of the MFP 1 by an operation (a first operation) that uses the LUI or an operation (a second operation) that uses the RUI.

The printer unit 206 prints images onto sheets based on image data received from an external apparatus or image data generated by the scanner unit 207. The scanner unit 207 (read unit) optically reads an original image and generates image data corresponding to the image. The scanner unit 207 may be equipped with an auto document feeder (document feeder). The image data generated by the scanner unit 207 may be used in print processing by the printer unit 206, saved in the HDD 204, or transmitted to an external apparatus by the communication unit 208. The communication unit 208 is connected to the network 2 and communicates with an external apparatus such as the LDAP server 3 and the PC 4 via the network 2.

<Processing in the MFP 1>

Figure 3:
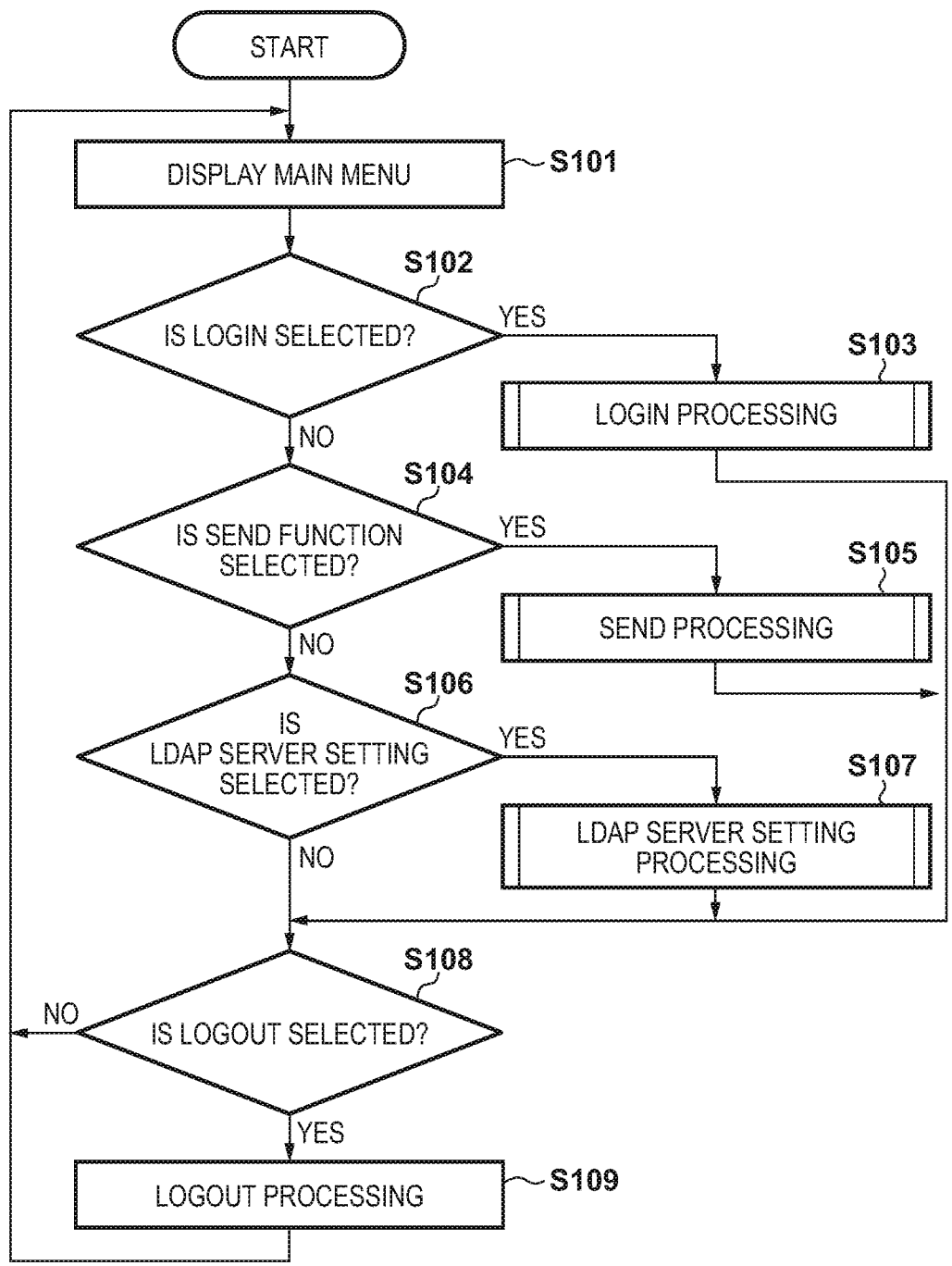
FIG. 3 is a flowchart illustrating a procedure of processing of the MFP according to an embodiment.

Next, description regarding processing executed in the MFP 1 is given with reference to FIG. 3. A computer program for executing processing illustrated in flowchart FIG. 3 is stored in the ROM 202 or the HDD 204 and is loaded into the RAM 203 and executed by the CPU 201.

Hereinafter, description is mainly given regarding processing in cases where the LUI is used (specifically in cases where operation of the MFP 1 is performed by using the operation unit 205). However, essentially the same processing is performed in cases where the RUI is used (specifically, in cases where operation of the MFP 1 is performed via the network 2 by using the Web browser of an external apparatus such as the PC 4). Accordingly, it is possible to display on an external apparatus such as the PC 4, by the RUI, a screen that enables an operation similar to an operation that can be performed on a respective screen displayed on the operation unit 205. The MFP 1 can accept operations by a user made via a screen displayed on an external apparatus. However, LDAP obtainment processing described later (step S609 of FIG. 10B) differs between cases where the LUI is used and cases where the RUI is used.

Figure 4A:
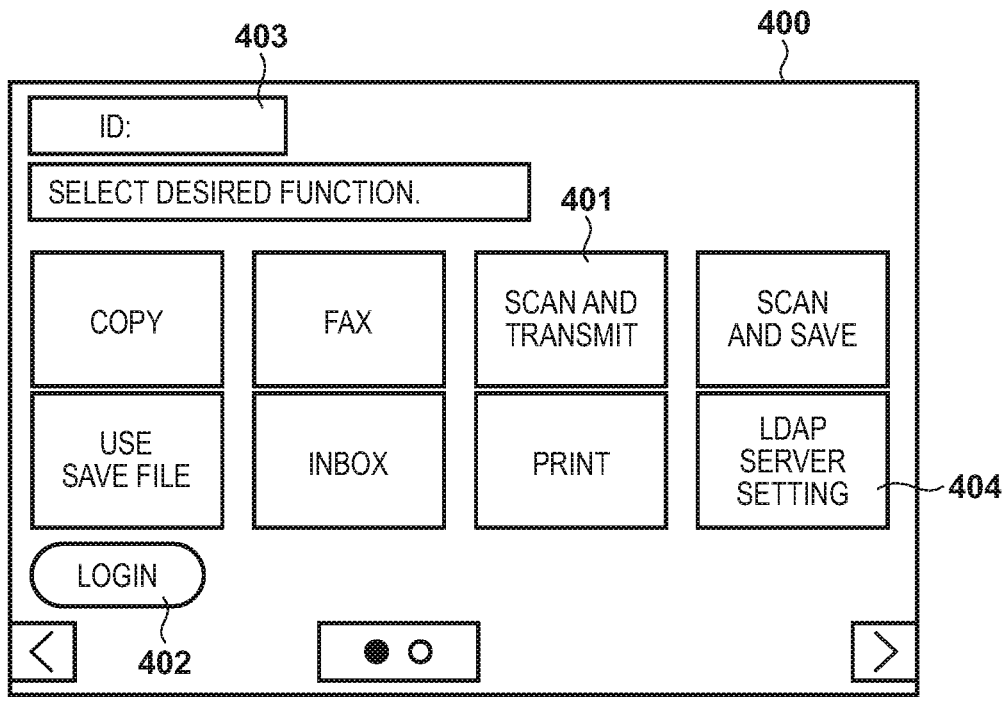
FIGS. 4A and 4B are views illustrating an example of a menu screen of the MFP according to an embodiment.

Firstly, in step S101, the CPU 201 displays onto the operation unit 205 a menu screen 400 that presents a main menu of the MFP 1 as illustrated in FIG. 4A. In the menu screen 400, the user can select a function to be used from among various functions that the MFP 1 has, such as a copy function, a facsimile (FAX) transmission function, a scan and transmit function (referred to as a "SEND function" hereinafter), a scan and save function, a print function, an LDAP server setting function, and an authentication function (login function).

Figure 4B:
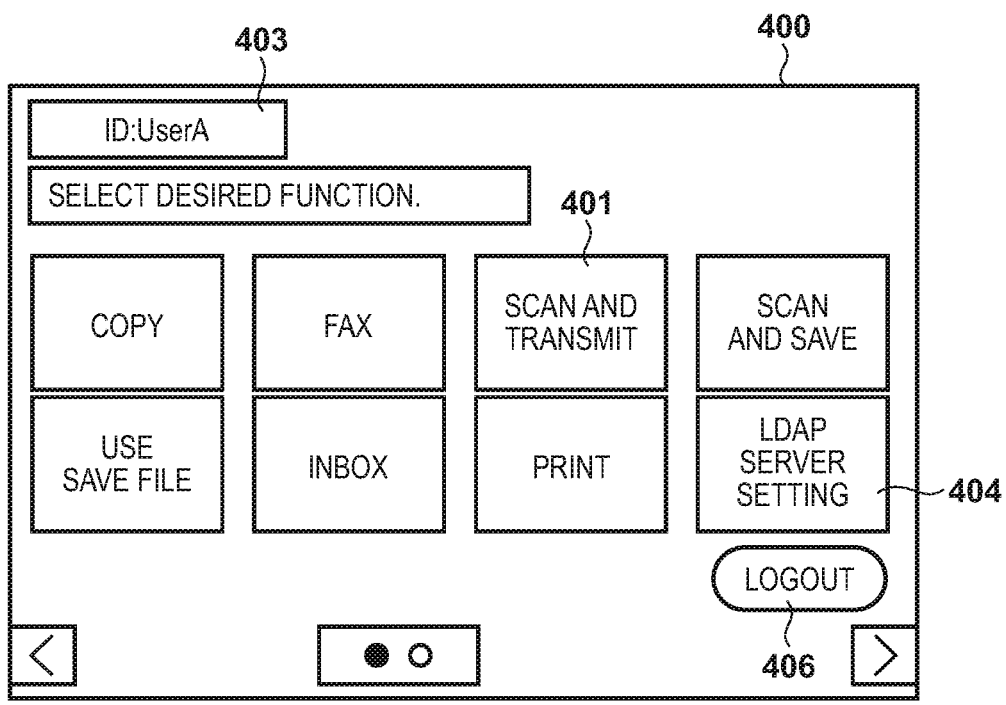
Figure 5A:
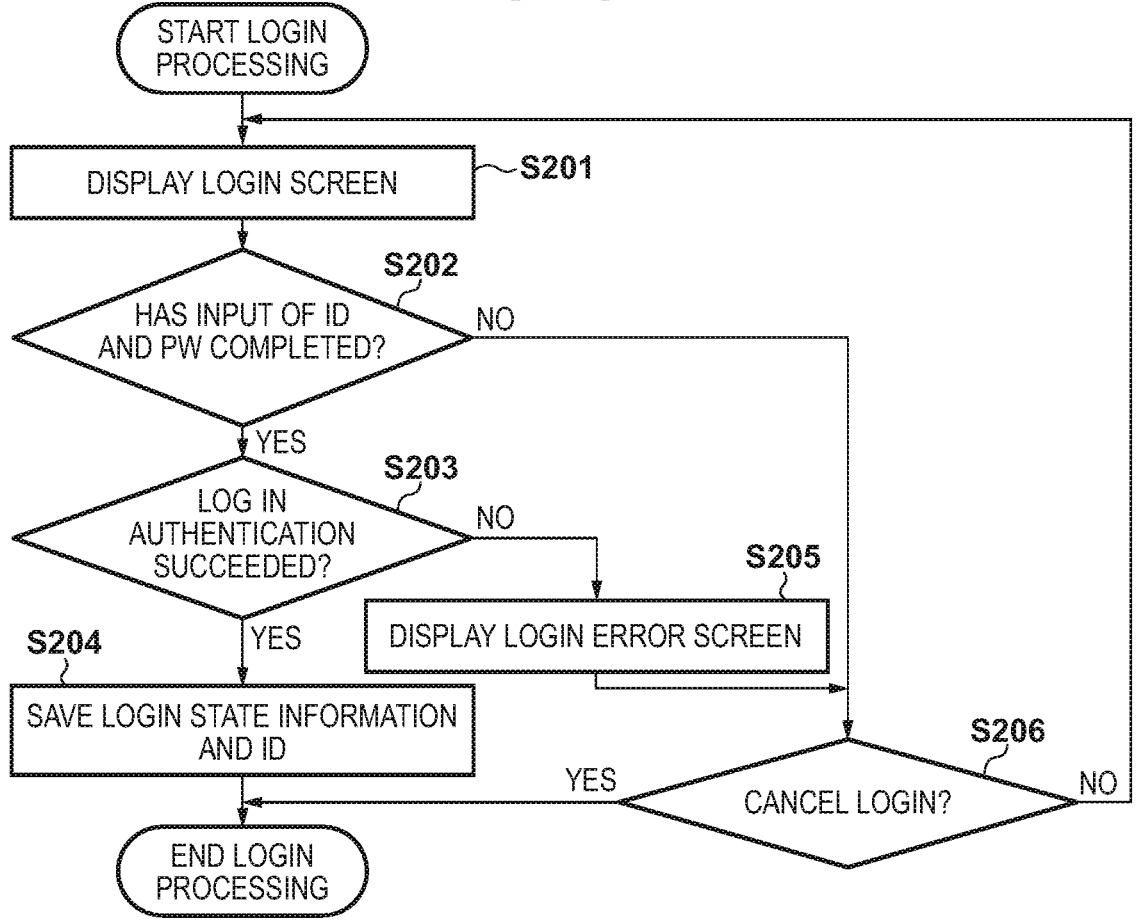
FIG. 5A is a flowchart illustrating a procedure of login processing according to an embodiment.

After display of the menu screen 400, the CPU 201 executes processing corresponding to a function selected by the user on the menu screen 400. Specifically, in a case where a login button 402 corresponding to an authentication function for authenticating the user using the MFP 1 is pressed ("YES" in step S102), the CPU 201 executes later-described login processing in step S103 (FIG. 5A). When a login of the user to the MFP 1 succeeds in this login processing, the display state of the menu screen 400 is updated from the state illustrated in FIG. 4A to the state illustrated in FIG. 4B. In FIG. 4B, a user ID ("UserA" in the present example) by which a logged-in user can be uniquely identified is displayed in an ID display area 403 of the menu screen 400, and this indicates that the user corresponding to the user ID has already logged in to the MFP 1. Note, if the user logs in to the MFP 1, a logout button 406 is displayed in place of the login button 402 on the menu screen 400, as illustrated in FIG. 4B.

In a case where a button 401 corresponding to a SEND function is pressed on the menu screen 400 ("YES" in step S104), the CPU 201 executes, in step S105, later-described SEND processing (FIG. 7) corresponding to the SEND function. Note, in step S105, the CPU 201 functions as an example of an acceptance unit configured to accept, as an operation for making an electronic data transmission destination setting, an operation (a first operation) using the LUI or an operation (a second operation) using the RUI. Also, in a case where an LDAP server setting button 404 is pressed on the menu screen 400 ("YES" in step S106), the CPU 201 executes, in step S107, later-described LDAP server setting processing (FIG. 5B) corresponding to the LDAP server setting function.

If the login processing, the SEND processing, or the LDAP server setting processing completes, the CPU 201 determines, in step S108, whether or not the logout button 406 was pressed. In a case where the logout button 406 has not been pressed, the CPU 201 returns the processing to step S101, and in a case where the logout button 406 was pressed, the CPU 201 executes logout processing in step S109. In the logout processing, login state information (login status) of the user currently logged in to the MFP 1 saved in the RAM 203 is updated from information indicating the user is logged in to information indicating that the user is not logged in. In addition, the user ID of the user saved in the MFP 1 is deleted. If the logout processing completes, the CPU 201 returns the processing to step S101. In this case, the display state of the menu screen 400 is updated, in accordance with the logout of the user, from the state illustrated in FIG. 4B to the state illustrated in FIG. 4A and the user ID is not displayed in the ID display area 403.

Note, although only the login processing, the SEND processing, the LDAP server setting processing, and the logout processing are illustrated in FIG. 3, the CPU 201 may execute processing in according with operations by the user for other functions indicated on the menu screen 400. Hereinafter, for the login processing, the SEND processing, and the LDAP server setting processing, specific examples of processing procedures are described respectively.

<Step S103: Login Processing>

Figure 6A:
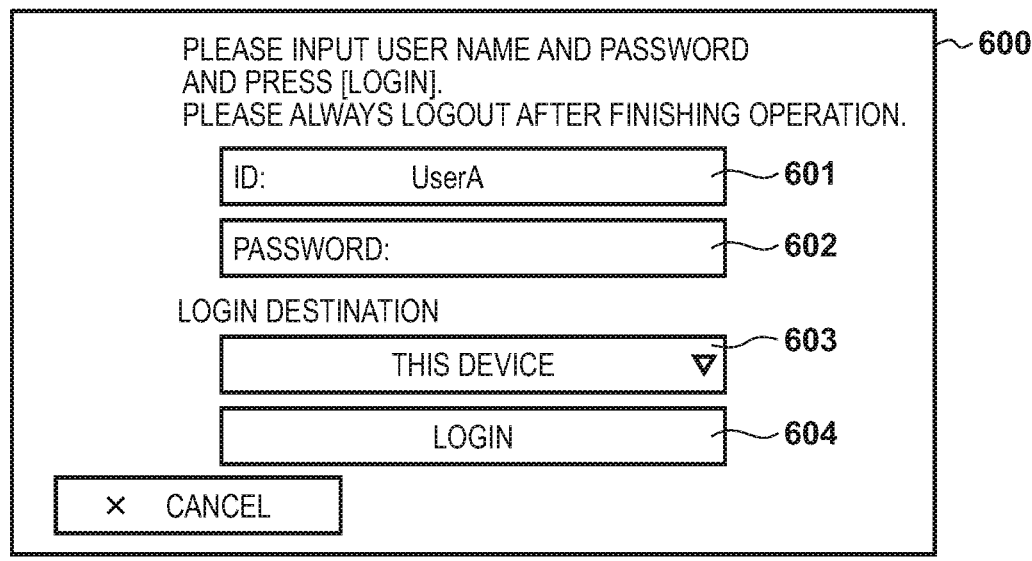
FIGS. 6A-6C are views illustrating examples of operation screens related to login processing and the LDAP server setting processing according to an embodiment.

FIG. 5A is a flowchart illustrating the procedure of the login processing (step S103). If the CPU 201 starts the login processing, the CPU 201 displays a login screen 600 onto the operation unit 205 in step S201 as illustrated in FIG. 6A. On the login screen 600, the user inputs into input fields 601 and 602 a user ID and password (PW) used in a login to the MFP 1 and performs an instruction for indicating a completion of the input of the user ID and PW by pressing a login button 604. Note, in a case where the MFP 1 has a configuration in which an external authentication server can be used for user authentication, the user can select the authentication server as a login destination device by using a button 603. By this, the user can cause the MFP 1 to execute user authentication using the authentication server.

The CPU 201 determines, in step S202, whether or not input of a user ID and PW has completed, and in the case that input has not completed, the CPU 201 determines, in step S206, whether or not to cancel the login processing. A cancellation of the login processing may be instructed from the user using a cancel button on the login screen 600. In a case where a cancellation of the login processing was instructed, the CPU 201 ends the login processing, and in a case where a cancellation of the login processing has not been instructed, the CPU 201 returns the processing to step S201, continues the display of the login screen 600, and awaits the completion of the input of a user ID and PW. If the input of a user ID and PW is completed ("YES" in step S202), the CPU 201 performs user authentication (login authentication) based on the inputted user ID and PW. If the user authentication succeeds, the CPU 201 advances the processing to step S204, saves login state information indicating that the user is logged in to the MFP 1 and the user ID to the RAM 203, and ends the login processing.

Figure 6B:
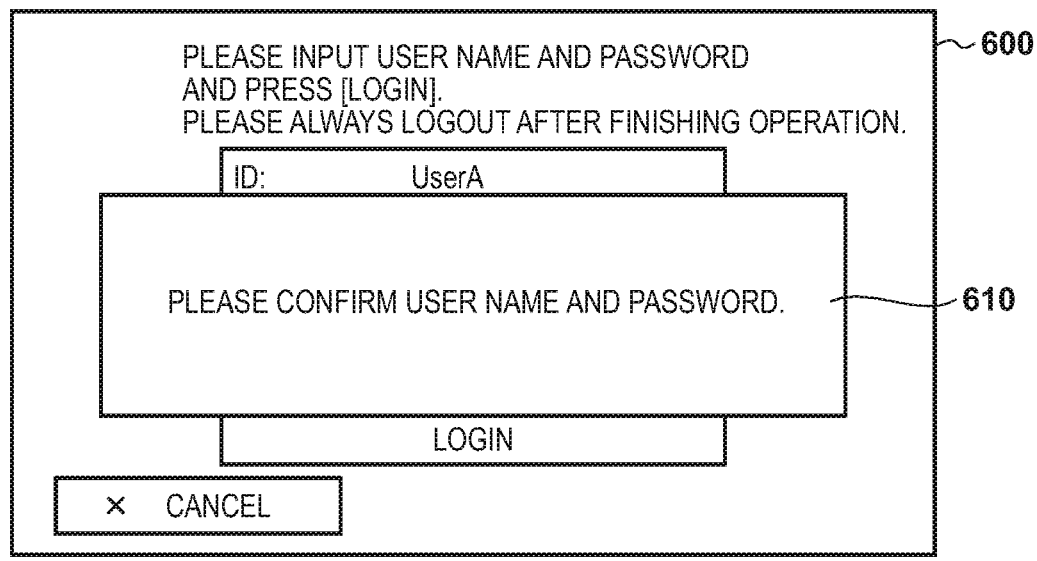

Meanwhile, if the login authentication fails, the CPU 201 displays (pop-up displays), for a fixed time, a login error screen 610 as illustrated in FIG. 6B to the operation unit 205 in step S205, and advances the processing to step S206. After this, as long as a cancellation of the login processing is not instructed, the CPU 201 repeats the aforementioned processing.

<Step S107: LDAP Server Setting Processing>

Figure 5B:
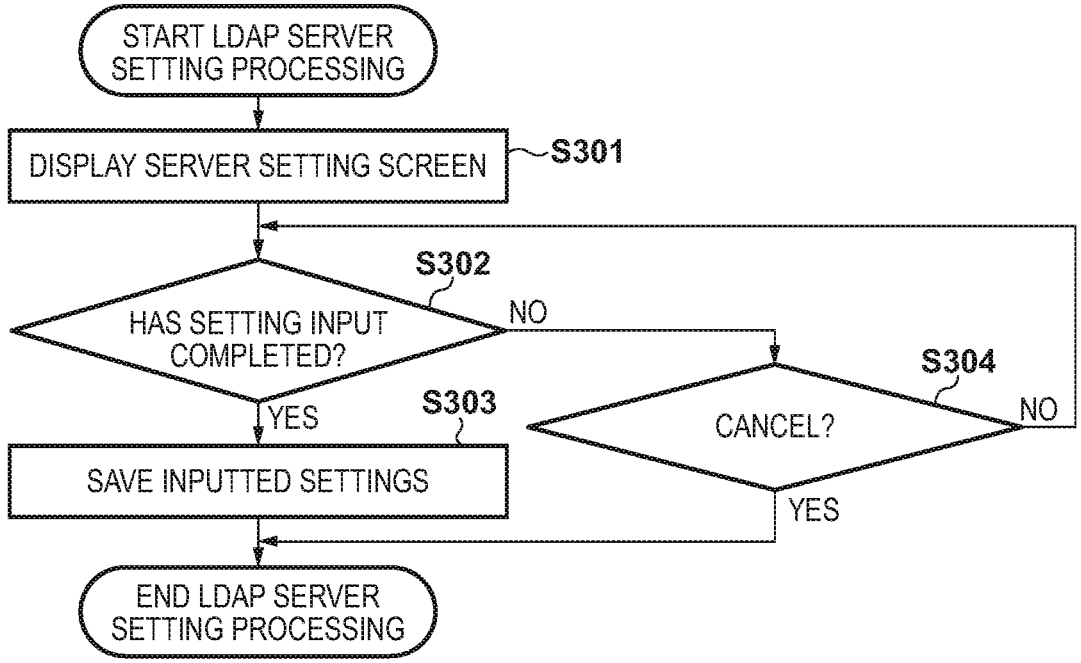
FIG. 5B is a flowchart illustrating a procedure of LDAP server setting processing according to an embodiment.
Figure 6C:
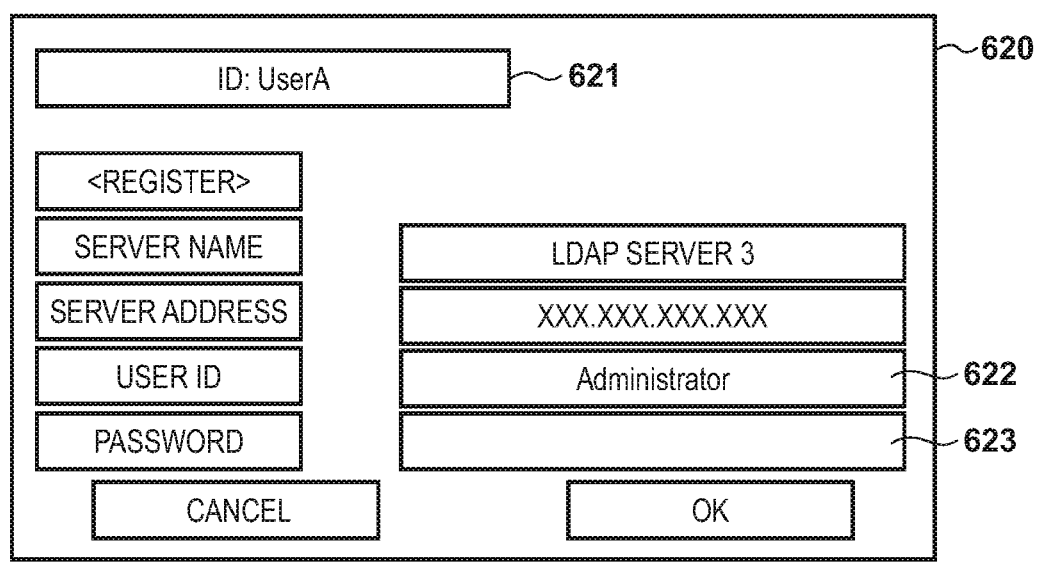

FIG. 5B is a flowchart illustrating the procedure of the LDAP server setting processing (step S107). If the CPU 201 starts the LDAP server setting processing, the CPU 201 displays a server setting screen 620 onto the operation unit 205 in step S301 as illustrated in FIG. 6C. The server setting screen 620 is used for setting a user ID and PW, which are authentication information necessary at a time of logging in to the LDAP server, in addition to a server name and a server address of the LDAP server connection target. The user inputs these settings onto the server setting screen 620 and, by pressing the OK button, performs an instruction indicating a completion of input.

The CPU 201 determines whether or not an input of settings on the server setting screen 620 has completed in step S302, and in a case where the input has not completed, determines whether or not to cancel the LDAP server setting processing in step S304. A cancellation of the LDAP server setting processing may be instructed from the user using a cancel button on the server setting screen 620. In a case where a cancellation of the LDAP server setting processing is instructed, the CPU 201 ends the LDAP server setting processing, and in a case where a cancellation of the LDAP server setting processing is not instructed, the CPU 201 returns the processing to step S302 and awaits the completion of inputting of settings. If the inputting of settings including authentication information is completed ("YES" in step S302), the CPU 201 saves the inputted settings to the HDD 204 as LDAP server settings, and ends the LDAP server setting processing.

<Step S105: SEND Processing>

FIG. 7 is a flowchart illustrating the procedure of the SEND processing (step S105). If the CPU 201 starts the SEND processing, in step S401, the CPU 201, by deleting a list, saved in the RAM 203, of destinations (transmission list) that have been designated as electronic data transmission destinations (transmission destinations) by SEND processing, initializes the saved transmission list. By this, a state in which not even one transmission destination is designated is entered.

Figure 8A:
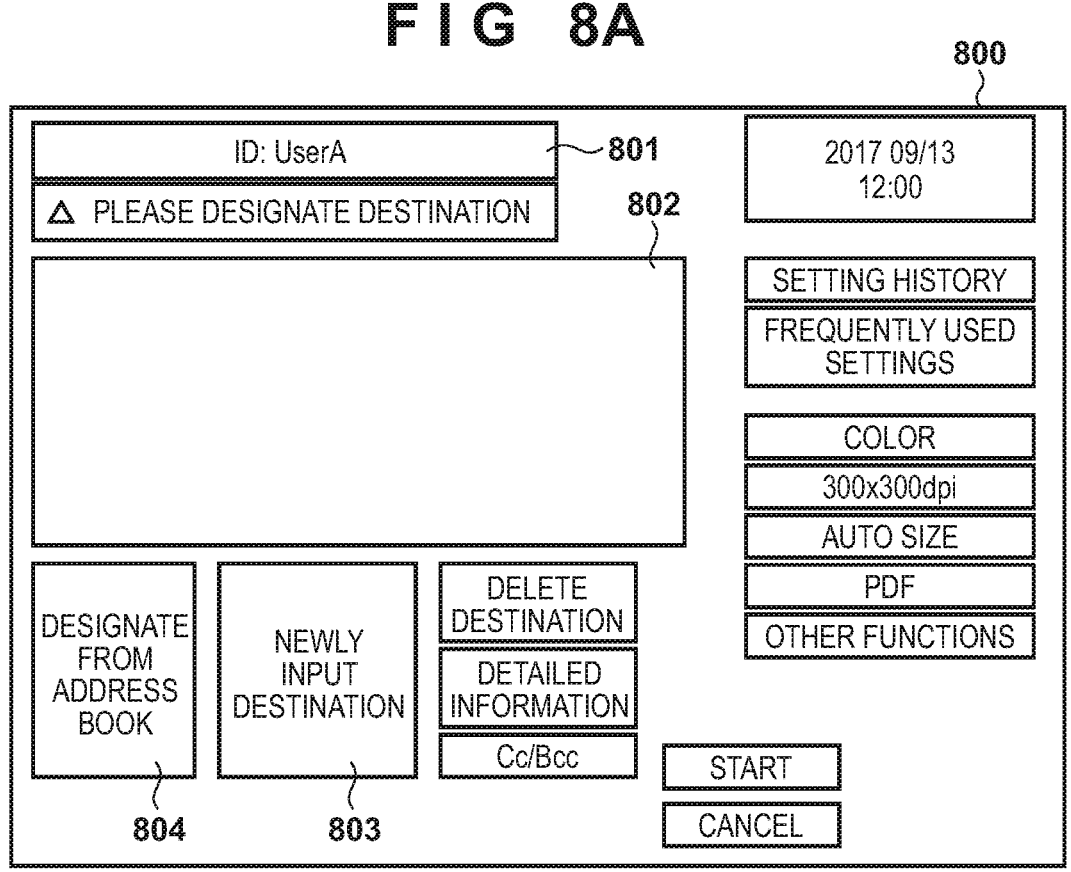
FIGS. 8A and 8B are views illustrating examples of operation screens related to the SEND processing according to an embodiment.

Next in step S402, the CPU 201 displays a transmission setting screen 800 as illustrated in FIG. 8A to the operation unit 205. A user ID saved in the RAM 203 is displayed to an ID display area 801 of the transmission setting screen 800 as the user ID of the logged-in user. Additionally, in step S403, the CPU 201 displays a list of (one or more) transmission destinations designated by the user to a destination display region 802 of the transmission setting screen 800. Note, the list of transmission destinations designated by the user is saved as a transmission list in the RAM 203.

Figure 8B:
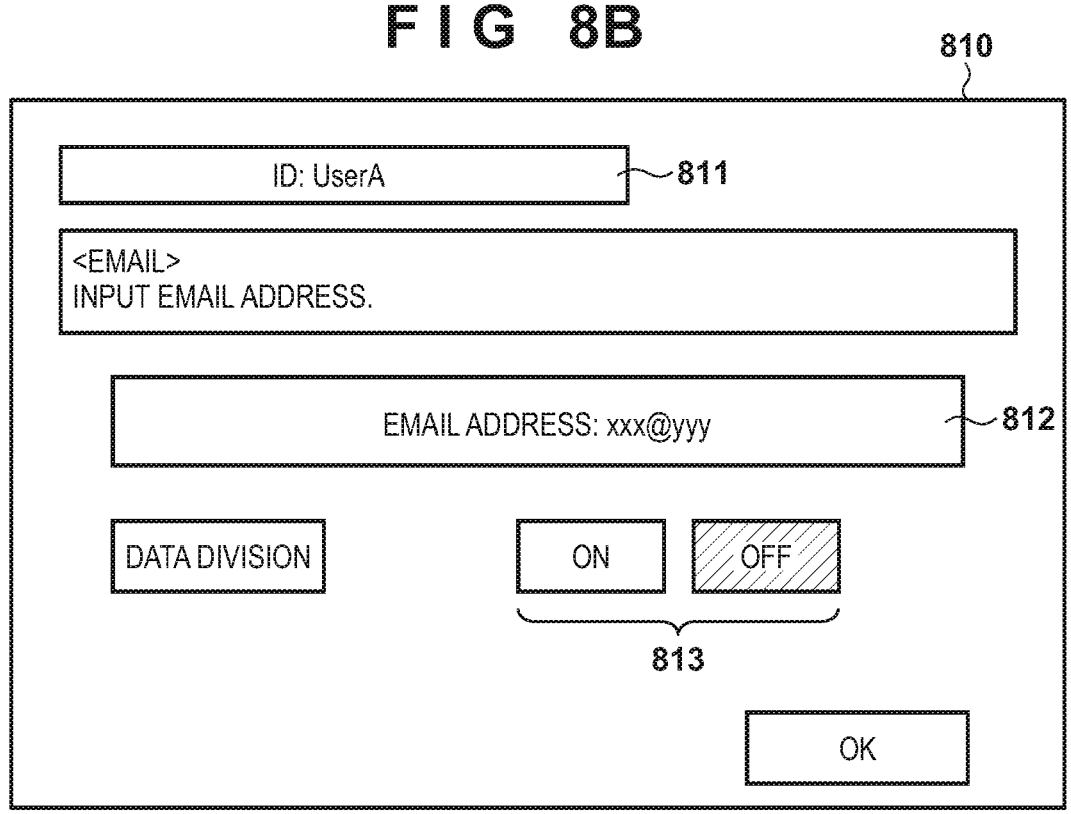

Next, in step S404, the CPU 201 determines whether or not an instruction to newly input a destination has been made by a button 803 being pressed, and advances the processing to step S405 in a case where a new input was instructed. Next in step S405, the CPU 201 displays a destination input screen 810 as illustrated in FIG. 8B to the operation unit 205. A screen on which an electronic mail address can be inputted in an input field 812 as a destination is shown on the destination input screen 810. However, in step S405, a screen on which a destination for a file server corresponding to a protocol such as SMB, FTP, or WebDAV, or an internet FAX can be inputted may be displayed in accordance with a designation by the user. Whether or not data division is performed if electronic data is transmitted to the destination inputted into the input field 812 can be set by using buttons 813 on the destination input screen 810.

After this, the CPU 201 determines whether or not input of a new destination has completed by the OK button on the destination input screen 810 being pressed in step S406, and if input has completed, the CPU 201 advances the processing to step S407. In step S407, the CPU 201 adds the destination inputted into the input field 812 to the transmission list saved in the RAM 203. After this, the CPU 201 returns the display screen of the operation unit 205 to the transmission setting screen 800, and advances the processing to step S408.

Meanwhile, the CPU 201 advances the processing to step S411 in a case where a new input is not instructed in step S404. In step S411, the CPU 201 determines whether or not designation of a transmission destination using an address book is instructed by the user pressing a button 804. The CPU 201 advances the processing to step S412 in a case where usage of the address book is instructed and advances the processing to step S408 in a case where there is no instruction. In step S412, the CPU 201 executes later-described address book processing (FIGS. 10A and 10B) for using the address book to designate a transmission destination, and after that, advances the processing to step S408.

In step S408, the CPU 201 determines whether or not to start transmission of electronic data by the SEND function. The CPU 201 advances the processing to step S409 in a case where a start of transmission is instructed by the user using the start button on the transmission setting screen 800, and advances the processing to step S413 in a case where a start of transmission is not instructed. The CPU 201 executes later-described data transmission processing (FIG. 9) in step S409, and advances the processing to step S410 after that. Meanwhile, the CPU 201 determines, in step S413, whether or not a cancellation of the SEND processing is instructed by using the cancel button on the transmission setting screen 800, and returns the processing to step S402 in a case where this is not instructed, and advances the processing to step S410 in a case where this is instructed. In step S410, the CPU 201 initializes the transmission list saved in the RAM 203 and ends the SEND processing.

<Step S409: Data Transmission Processing>

FIG. 9 is a flowchart illustrating the procedure of the data transmission processing (step S409). If the CPU 201 starts the data transmission processing, an original is scanned by using the scanner unit 207 in step S501 and the CPU 201 generates electronic data to be transmitted to a transmission destination. After this, in step S502 to step S504, the CPU 201 executes processing for transmitting in order electronic data to each destination included in the transmission list saved in the RAM 203.

Specifically, in step S502, the CPU 201 determines whether or not a destination, to which electronic data has yet to be transmitted, exists among the destinations included in the transmission list saved in the RAM 203. The CPU 201 ends the data transmission processing in a case where there is no destination yet to be transmitted to, and advances the processing to step S503 in a case where there is a destination yet to be transmitted to. In step S503, the CPU 201 selects one destination yet to be transmitted to from the transmission list. Furthermore, in step S504, the CPU 201, by a protocol corresponding to the selected destination, transmits electronic data to that destination by using the communication unit 208. If transmission of the electronic data is completed, the CPU 201 returns the processing to step S502 and performs the above described processing again.

<Step S412: Address Book Processing>

Figure 10A:
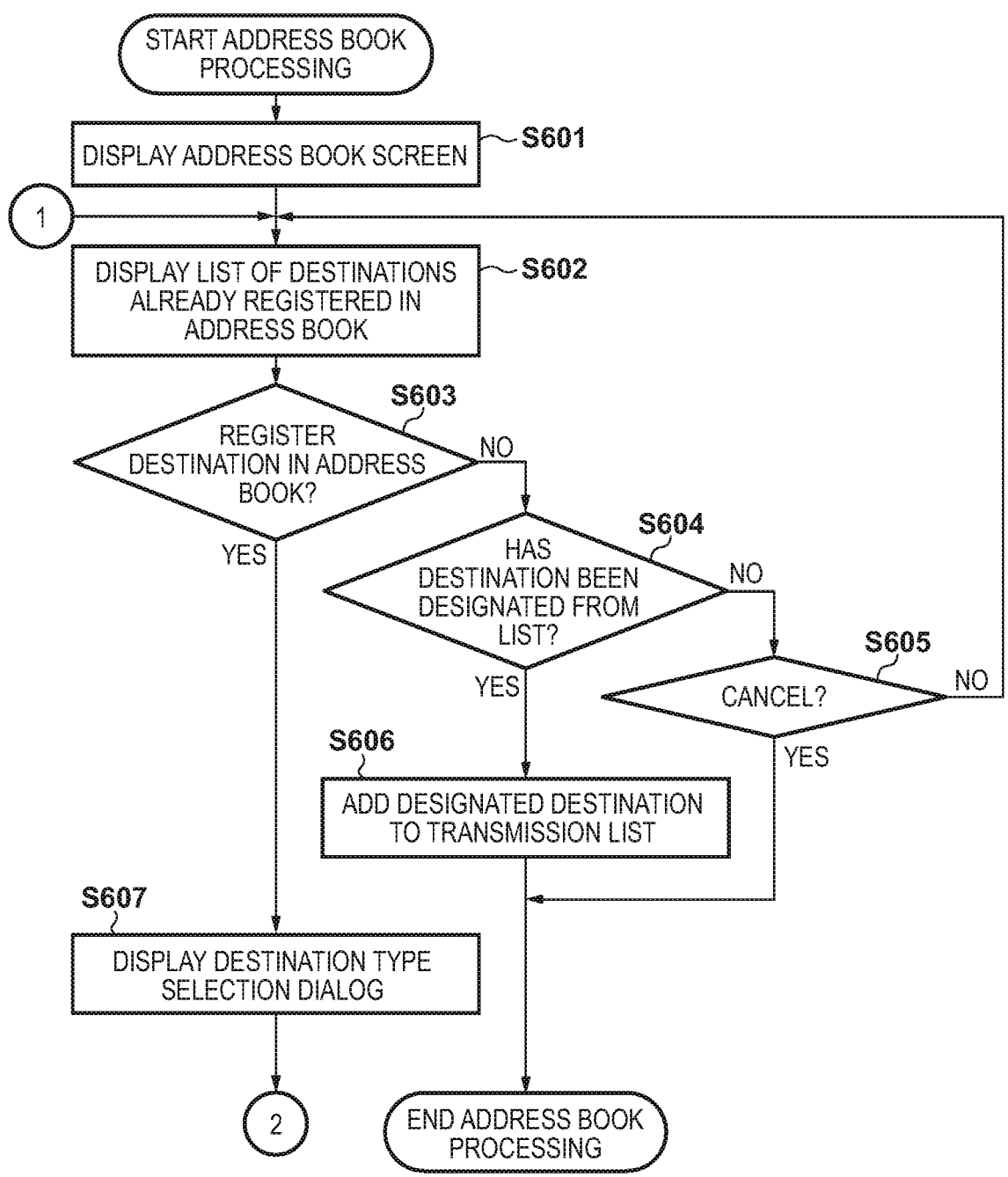
FIGS. 10A and 10B are flowcharts illustrating a procedure of address book processing according to an embodiment.
Figure 10B:
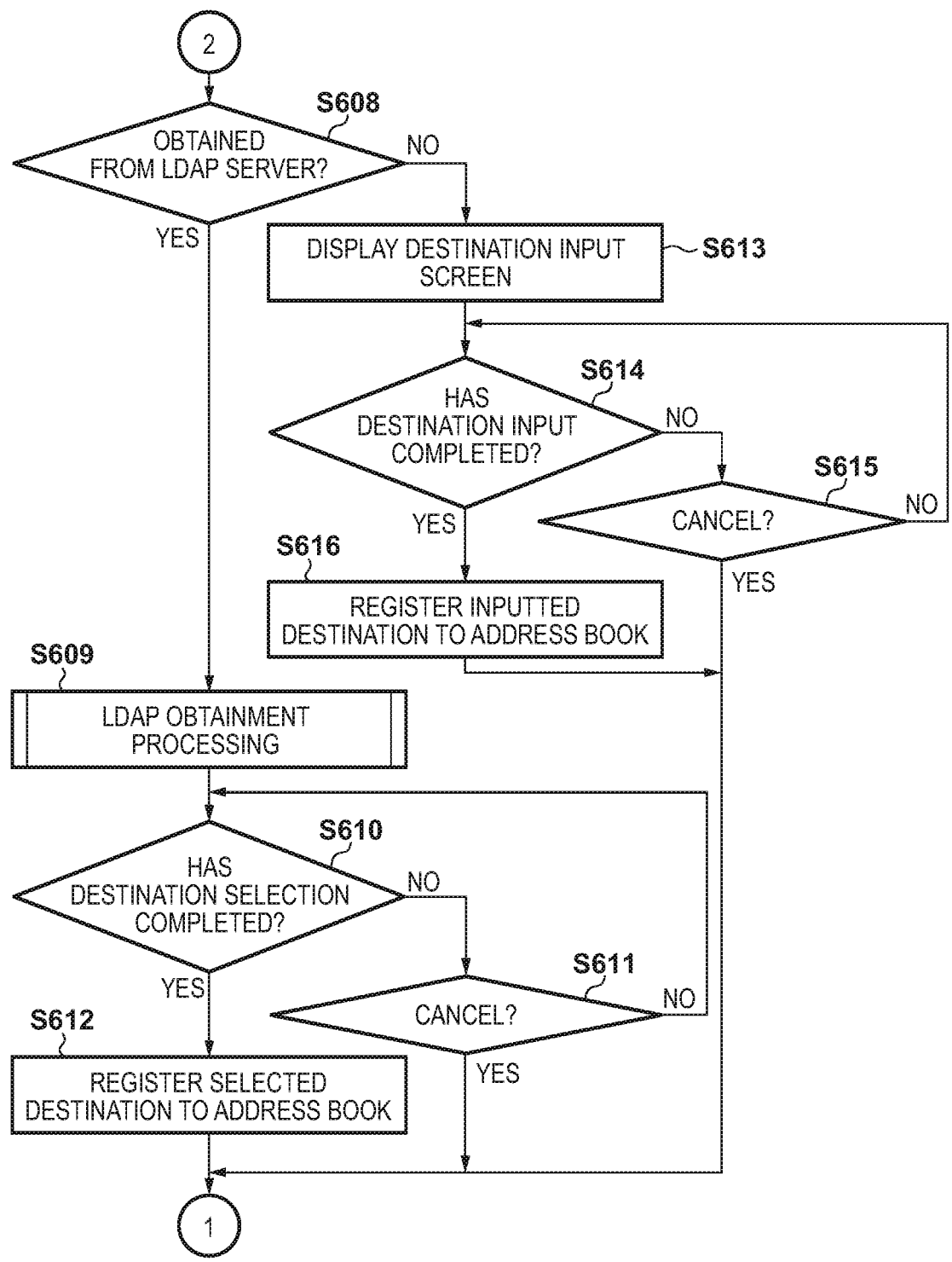
Figure 11A:
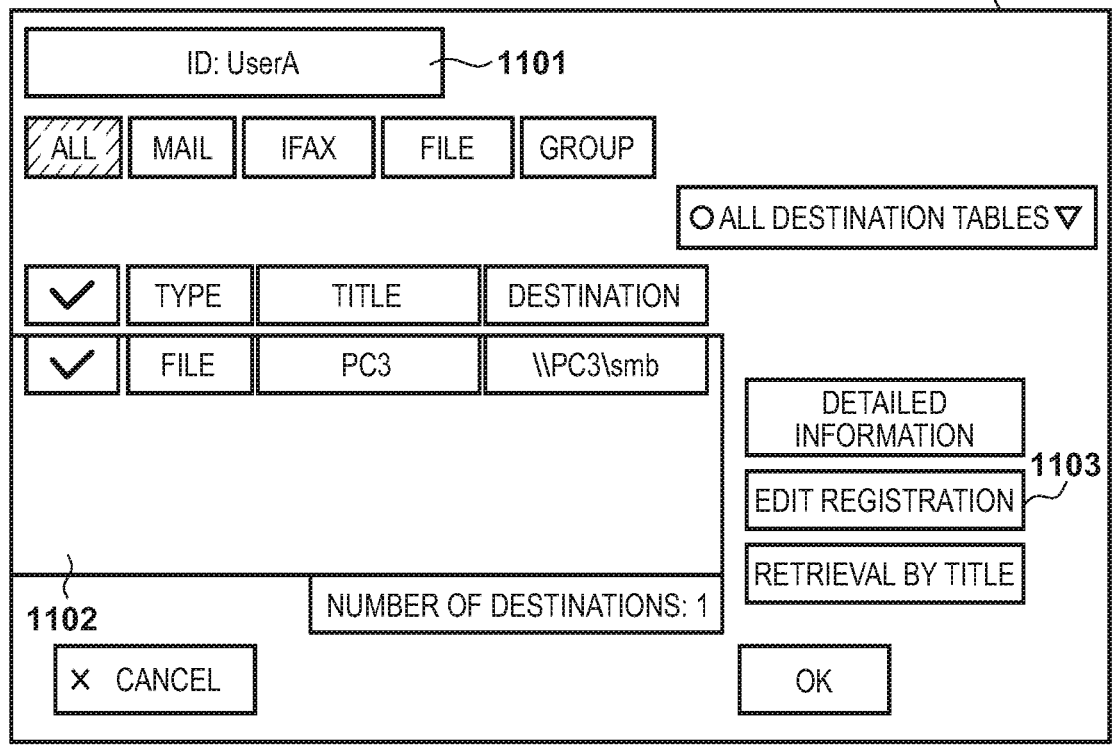
FIGS. 11A and 11B are views illustrating examples of operation screens related to the address book processing according to an embodiment.

FIGS. 10A and 10B are flowcharts illustrating the procedure of the address book processing (step S412). If the CPU 201 starts the address book processing, the CPU 201 displays an address book screen 1100 onto the operation unit 205 in step S601 as illustrated in FIG. 11A. A user ID saved in the RAM 203 is displayed to an ID display area 1101 of the address book screen 1100 as the user ID of the logged-in user. Next, in step S602, the CPU 201 obtains a list of destinations already registered in the address book saved in the HDD 204 and displays these to a destination denotation region 1102.

After this, in step S603, the CPU 201 determines whether or not a registration of a destination to the address book is instructed by the user pressing a registration edit button 1103 on the address book screen 1100. The CPU 201 advances the processing to step S607 in a case where registration of a destination to the address book is instructed and advances the processing to step S604 in a case where there is no instruction. In step S604, the CPU 201 determines whether or not one or more destinations from the list of destinations displayed on the destination denotation region 1102 are designated as a destination that should be added to the transmission list. The user can designate one or more destinations for the transmission list by selecting the one or more destinations from the list displayed on the destination denotation region 1102 and pressing the OK button. The CPU 201 advances the processing to step S606 in a case where one or more destinations are designated, adds the designated destination to the transmission list saved in the RAM 203, and ends the address book processing.

Meanwhile, the CPU 201 advances the processing to step S605 in a case where a destination is not designated in step S604, and determines whether or not a cancellation of the address book processing is instructed by the user using the cancel button of the address book screen 1100. The CPU 201 ends the address book processing in a case where cancellation of the address book processing is instructed and returns the processing to step S602 in a case where there is no such instruction.

Figure 11B:
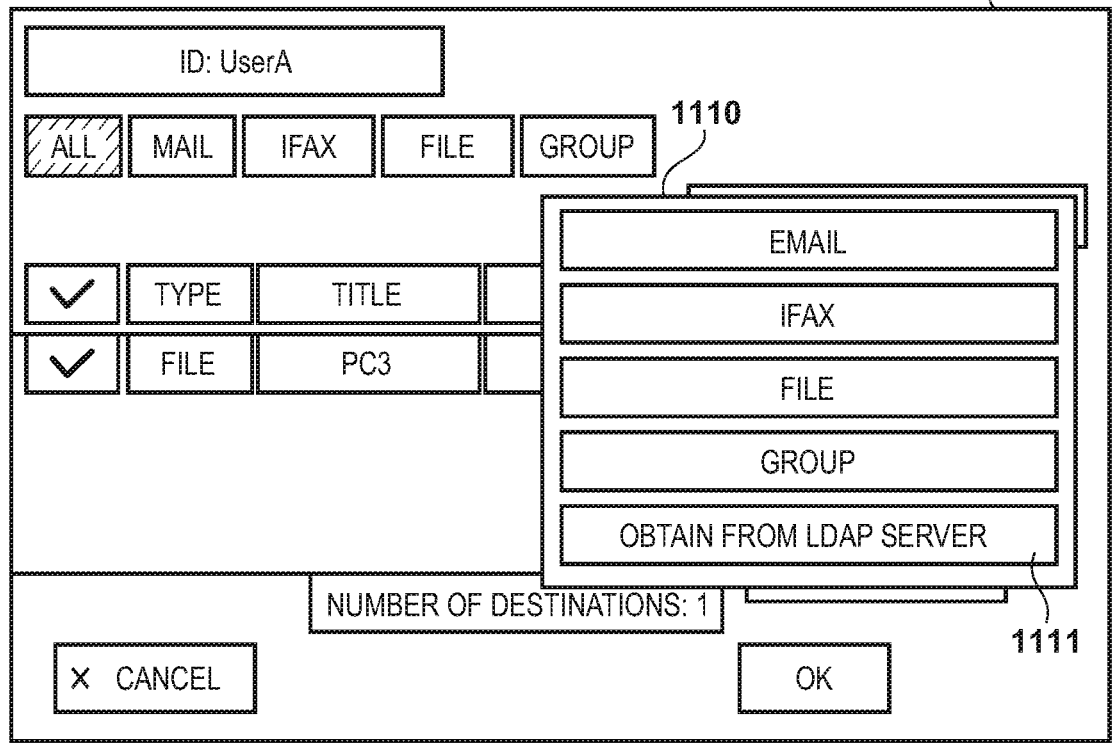

In a case where the processing advances from step S603 to step S607, the CPU 201 executes processing for registering a new destination to the address book in step S607 to step S616. Specifically, in step S607, the CPU 201 displays (pop-up displays) a destination type selection dialog 1110 onto the address book screen 1100 as illustrated in FIG. 11B. The user can select the type of destination to be registered in the address book by using the destination type selection dialog 1110. In step S608, the CPU 201 determines whether or not obtaining a destination for registration to the address book from the LDAP server 3 was selected by using the destination type selection dialog 1110. The CPU 201 advances the processing to step S609 in a case where obtainment from the LDAP server 3 was selected and advances the processing to step S613 in a case where there was no selection.

In step S609, the CPU 201 executes later-described LDAP obtainment processing (FIG. 13 and FIG. 15) which is processing for, in accordance with an operation using the LUI or the RUI, logging in to the LDAP server 3 and obtaining a transmission destination from the server, and after that, the CPU 201 advances the processing to step S610. At that time, the CPU 201 displays to the operation unit 205 an obtainment result screen 1200 that includes a list of destinations obtained from the LDAP server 3 as illustrated to FIG. 12A. The list of destinations obtained from the LDAP server 3 is displayed to a destination denotation region 1201 of the obtainment result screen 1200. The user selects one or more destinations within the destination denotation region 1201 and performs an instruction indicating completion of the selection of destinations by pressing the OK button.

In step S610, the CPU 201 determines whether or not the selection of destinations by the user from the list of destinations obtained from the LDAP server 3 is completed, and in a case where the selection is completed, advances the processing to step S612, and in a case where the selection is not completed, advances the processing to step S611. In step S611, the CPU 201 determines whether or not the cancel button was pressed on the obtainment result screen 1200, and in a case where the cancel button was pressed, returns the processing to step S602, and displays the address book screen 1100 onto the operation unit 205.

Meanwhile, in step S612, the CPU 201 registers (adds) destinations that the user selected from the list of destinations obtained from the LDAP server 3 to the address book saved in the HDD 204. After that, the CPU 201 returns the processing to step S602 and displays the address book screen 1100 onto the operation unit 205. In this case, the destinations registered to the address book in step S612 will be newly displayed in the destination denotation region 1102. By this, it becomes possible for the user to designate newly displayed destinations as destinations to be added to the transmission list (step S604 and step S605).

Also, in a case where the processing advances from step S608 to step S613, the CPU 201 displays a destination input screen 1210 onto the operation unit 205 as illustrated in FIG. 12B. On the destination input screen 1210, a screen on which a destination for registration to the address book (an electronic mail address) can be inputted into an input field 1211 is shown. However, in step S613, a screen on which another type of destination (for example, a destination for an Internet FAX) can be inputted may be displayed in accordance with a selection by the user using the destination type selection dialog 1110.

After this, in step S614, the CPU 201 determines whether or not the input of the destination on the destination input screen 1210 is completed by the OK button of the destination input screen 1210 being pressed, and in a case where the input is completed, the CPU 201 advances the processing to step S616, and in a case where the input is not completed, the CPU 201 advances the processing to step S615. In step S615, the CPU 201 determines whether or not the cancel button was pressed on the destination input screen 1210, and in a case where the cancel button was pressed, returns the processing to step S602, and displays the address book screen 1100 onto the operation unit 205.

Meanwhile, in step S616, the CPU 201 registers (adds) the destinations inputted to the input field 1211 of the destination input screen 1210 to the address book saved in the HDD 204. After that, the CPU 201 returns the processing to step S602 and displays the address book screen 1100 onto the operation unit 205. In this case, the destinations registered to the address book in step S612 will be newly displayed in the destination denotation region 1102. By this, it becomes possible for the user to designate newly displayed destinations as destinations to be added to the transmission list (step S604 and step S605).

<Step S609: LDAP Obtainment Processing (LUI)>

Regarding the respective processing described above that is executed in the MFP 1, similar processing may be performed in a case where operation by the user is performed using a local UI (LUI) and in a case where operation is performed using a remote UI (RUI). However, in the present embodiment, the LDAP obtainment processing (step S609) differs in a case where the LUI is used from a case where the RUI is used. In the present embodiment, the CPU 201 performs control to use authentication information stored in the HDD 204 at the time of a log in to the LDAP server 3 in accordance with an operation using the LUI. Meanwhile, the CPU 201 performs control to not use authentication information stored in the HDD 204 at the time of a log in to the LDAP server 3 in accordance with an operation using the RUI.

Figure 13:
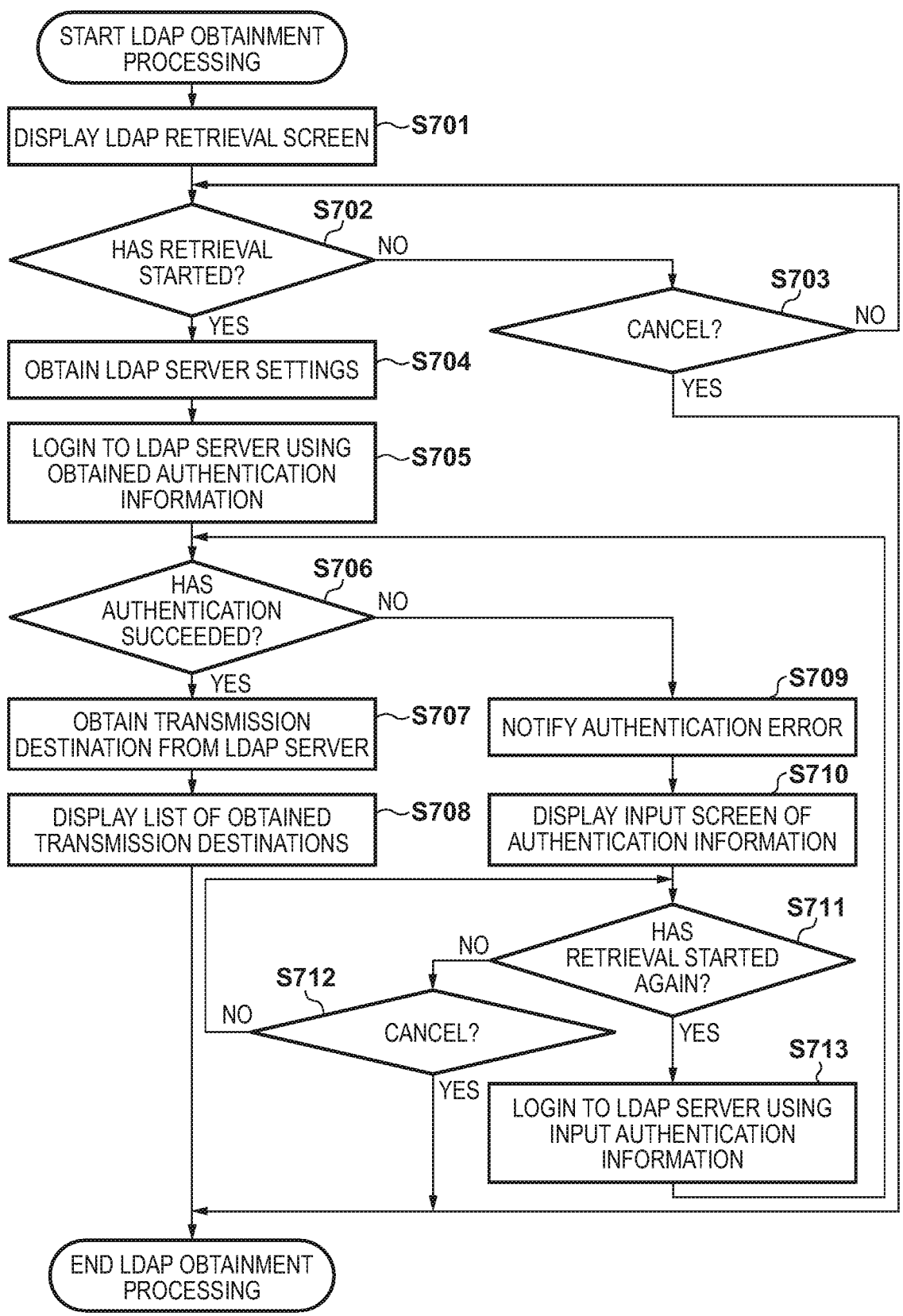
FIG. 13 is a flowchart illustrating a procedure of LDAP obtainment processing when an LUI is used according to an embodiment.
Figure 14A:
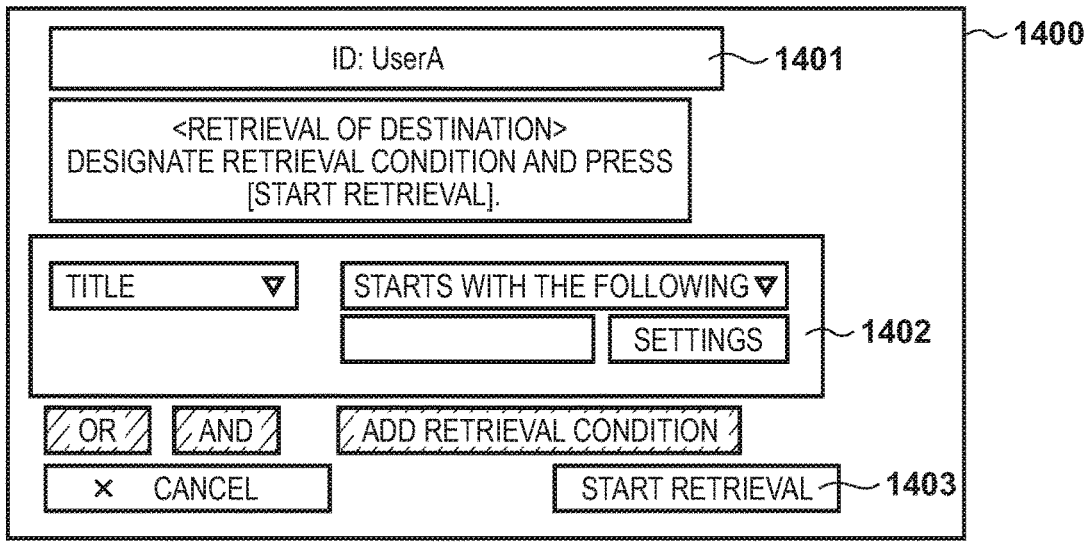
FIGS. 14A-14C are views illustrating examples of operation screens related to the LDAP obtainment processing according to an embodiment.

Firstly, with reference to FIG. 13, a procedure for LDAP obtainment processing (step S609) that is executed in the case where the LUI is used will be described. If the CPU 201 starts the LDAP obtainment processing, the CPU 201 displays an LDAP retrieval screen 1400 onto the operation unit 205 in step S701 as illustrated in FIG. 14A. Next, in step S702, the CPU 201 determines whether or not to start a retrieval of information that is being managed by the LDAP server 3 in accordance with an instruction from the user. The CPU 201, if the start of a retrieval is instructed by the user in accordance with a press of a retrieval start button 1403, advances the processing to step S704, and starts the retrieval. Meanwhile, if the retrieval start button 1403 is not pressed, the processing advances to step S703, and the CPU 201 determines whether or not a cancellation of the LDAP obtainment processing was instructed by the user using the cancel button on the LDAP retrieval screen 1400. The CPU 201 ends the LDAP obtainment processing in a case where cancellation of the LDAP obtainment processing is instructed and returns the processing to step S702 in a case where there is no such instruction.

In step S704, the CPU 201 obtains from the HDD 204 LDAP server settings that were registered by the LDAP server setting processing (step S107). After that, in step S705, the CPU 201 uses the communication unit 208 to access (connect to) the LDAP server (the LDAP server 3 in the present example) corresponding to the server name and the server address included in the obtained LDAP server settings and to attempt to log in. Specifically, the CPU 201 uses authentication information (a user ID and PW) included in the obtained LDAP server settings to attempt to log in to the LDAP server 3. In step S706, the CPU 201 determines whether or not a response indicating login success was received from the LDAP server 3 (whether or not login authentication by the LDAP server 3 succeeded). The CPU 201 advances the processing to step S707 in a case where login to the LDAP server 3 succeeded and advances the processing to step S709 in a case where it failed. If logging in to the LDAP server 3 in accordance with an operation using the LUI in this way, the CPU 201, without displaying an authentication information input screen on the operation unit 205, uses the authentication information stored in the HDD 204 to log in to the LDAP server 3.

In step S707, the CPU 201, based on the retrieval condition that the user inputted into the LDAP retrieval screen 1400, executes the retrieval with respect to the LDAP server 3, and obtains from the LDAP server 3 one or more transmission destinations that satisfy the retrieval condition. Thereafter, in step S708, the CPU 201 displays the obtainment result screen 1200 as illustrated in FIG. 12A on the operation unit 205, displays the obtained list of destinations on the destination denotation region 1201 of the screen, and ends the LDAP obtainment processing.

Figure 14B:
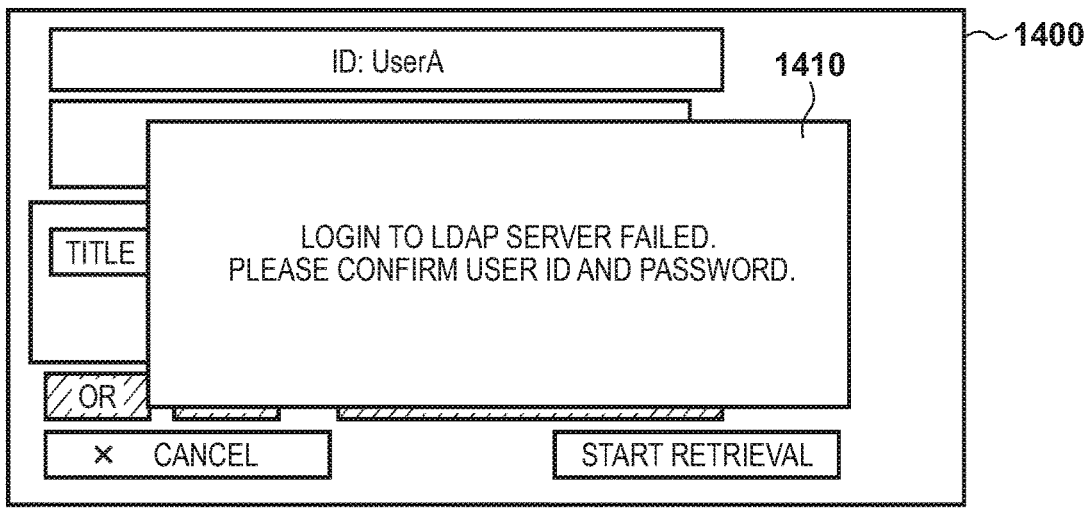
Figure 14C:
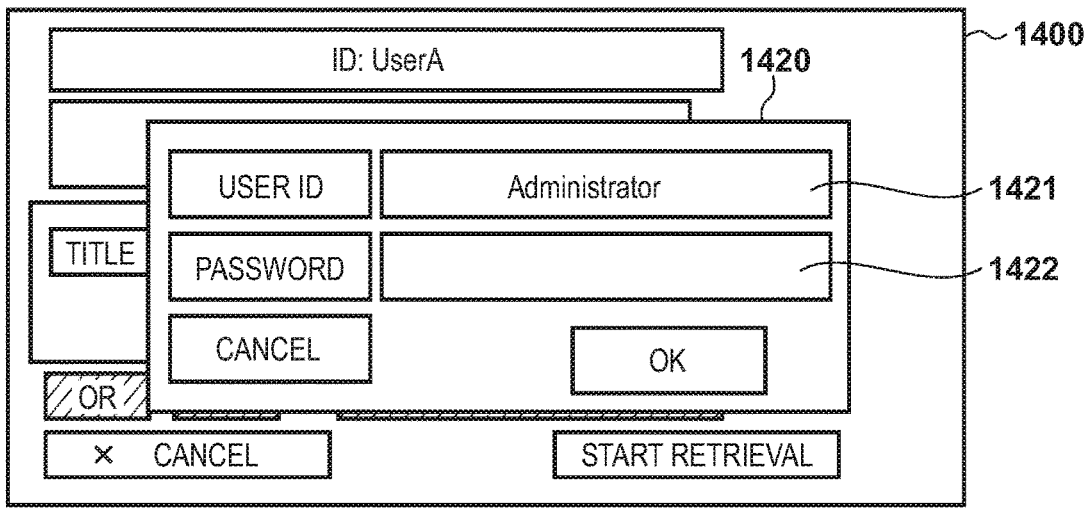

Meanwhile, in step S709, the CPU 201 displays (pop-up displays) an error notification screen 1410 as illustrated in FIG. 14B for a fixed time on the operation unit 205. After that, in step S710, the CPU 201 displays (pop-up displays) an authentication information input screen 1420 as illustrated in FIG. 14C for a fixed time on the operation unit 205. The user can newly input the user ID and PW (authentication information) into input fields 1421 and 1422 of the input screen 1420 respectively. Note that the MFP 1 of the present embodiment may have a function (input completion function) for displaying in advance authentication information included in the LDAP server settings on the input fields 1421 and 1422 of the input screen 1420. In a case where completion for the input fields 1421 and 1422 is performed according to this function, the user can input the user ID and PW by changing the user ID and PW displayed in the input fields 1421 and 1422.

After display of the input screen 1420, the CPU 201, in step S711, determines whether or not execution of a re-retrieval in relation to the LDAP server 3 was instructed by the user pressing an OK button on the input screen 1420. The CPU 201, in a case where execution of a re-retrieval has not been instructed by the user, in step S712, determines whether or not cancellation of the LDAP obtainment processing was instructed by the user using the cancel button on the input screen 1420. The CPU 201 ends the LDAP obtainment processing in a case where cancellation of the LDAP obtainment processing was instructed and returns the processing to step S711 in a case where there was no such instruction.

The CPU 201, in a case where execution of a re-retrieval was instructed by the user, advances the processing to step S712 from step S711. In step S712, the CPU 201 uses the authentication information inputted by the user on the input screen 1420 to attempt to log in to the LDAP server 3, and returns the processing to step S706. If, in step S706, login to the LDAP server 3 succeeds, the CPU 201 executes the processing of step S707 and step S708 described above.

<Step S609: LDAP Obtainment Processing (RUD)>

Figure 15:
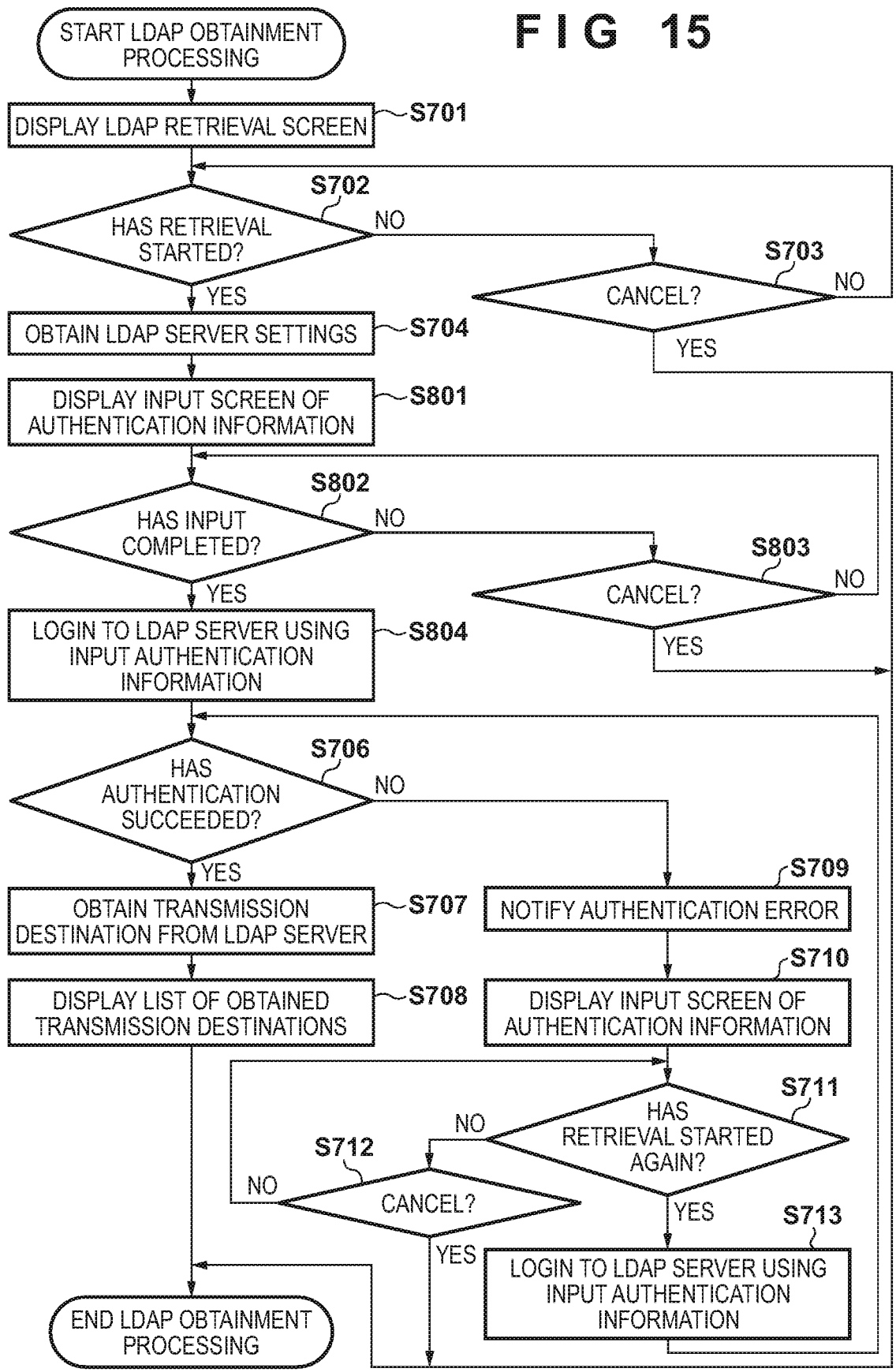
FIG. 15 is a flowchart illustrating a procedure of the LDAP obtainment processing when an RUI is used according to an embodiment.

Next, with reference to FIG. 15, a procedure for LDAP obtainment processing (step S609) that is executed in the case where the RUI is used will be described. In the flowchart of FIG. 15, compared with the flowchart of FIG. 13, step S705 is replaced with step S801 to step S804. Specifically, in the case where the RUI is used, login to the LDAP server 3 is not performed using the authentication information included in the LDAP server setting. In place of this, in the PC 4, the input screen of the authentication information is displayed in accordance with the operation using the RUI. The PC 4 transmits to the MFP 1 the authentication information inputted by the user via the input screen. In the MFP 1, login to the LDAP server 3 is performed using the authentication information received from the PC 4.

Specifically, the CPU 201, after obtaining the LDAP server setting from the HDD 204 in step S704, advances the processing to step S801, and causes the authentication information input screen 1420 as illustrated in FIG. 14C to be displayed on the PC 4 via the RUI. At that time, the CPU 201 prohibits use of the above-described input completion function, and makes it so that the authentication information included in the LDAP server settings are not caused to be displayed in advance in the input fields 1421 and 1422 on the input screen 1420.

After displaying the input screen 1420, the CPU 201, in step S802, determines whether or not input of authentication information (user ID and PW) on the input screen 1420 has completed in accordance with a pressing of the OK button on the input screen 1420. The CPU 201, in a case where inputting of authentication information has completed, advances the processing to step S804, and in a case where inputting of authentication information has not completed, advances the processing to step S803. In step S803, the CPU 201 determines whether or not cancellation of the LDAP obtainment processing was instructed by the user using the cancel button of the input screen 1420. The CPU 201 ends the LDAP obtainment processing in a case where cancellation of the LDAP obtainment processing was instructed and returns the processing to step S802 in a case where there was no such instruction.

In step S804, the CPU 201 accesses (connects to) the LDAP server (the LDAP server 3 in the present example) corresponding to the server name and the server address included in the LDAP server settings obtained in step S704 and attempts to log in. At that time, the CPU 201 receives from the PC 4 authentication information inputted by the user on the input screen 1420 (the input fields 1421 and 1422), and attempts to log in to the LDAP server 3 by using the received authentication information. In step S706, the CPU 201 determines whether or not a response indicating login success was received from the LDAP server 3 (whether or not login authentication by the LDAP server 3 succeeded). The CPU 201 advances the processing to step S707 in a case where login to the LDAP server 3 succeeded and advances the processing to step S709 in a case where it failed. The processing from step S707 or step S709 is similar to the processing described above using FIG. 13.

As described above, in the MFP 1 of the present embodiment, authentication information for logging in to the LDAP server 3, which manages electronic data transmission destinations, is stored in the HDD 204. The CPU 201 accepts, as an operation for making an electronic data transmission destination setting, an operation (a first operation) using the LUI or an operation (a second operation) using the RUI. The CPU 201, in accordance with an accepted operation, logs in to the LDAP server 3, and performs obtainment processing for obtaining a transmission destination from the server. In this obtainment processing, the CPU 201 performs control to use authentication information stored in the HDD 204 at the time of a log in to the LDAP server 3 in accordance with an operation using the LUI. Meanwhile, the CPU 201 performs control to not use authentication information stored in the HDD 204 at the time of a log in to the LDAP server 3 in accordance with an operation using the RUI.

By virtue of the present embodiment, it becomes possible to prevent the LDAP server 3 from being accessed via an RUI of the MFP 1 by using authentication information saved in the MFP 1, which can communicate with the LDAP server 3. Thereby, it is possible to prevent information that the LDAP server 3 is managing from leaking via the remote UI.

Other Embodiments

In the above-described embodiments, in the LDAP obtainment processing in the case where the RUI is used, the MFP 1 causes the authentication information input screen 1420 to be displayed on the external apparatus (the PC 4) in step S801, and accepts input of authentication information from a user via the input screen 1420. However, while the user who was authenticated in the login processing (step S103) in the MFP 1 is logged in to the MFP 1, the authentication information that is stored in the HDD 204 may be used if logging in to the LDAP server 3 in accordance with an operation using the RUI. Accordingly, the convenience for the user who uses the MFP 1 may be improved.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-195380, filed Oct. 5, 2017, which is hereby incorporated by reference herein in its entirety.

What is claimed is:

1. A communication apparatus communicating with an LDAP (Lightweight Directory Access Protocol) server, wherein the LDAP server is arranged within an intranet, comprising:
   a storage;
   a memory storing instructions, and
   at least one processor for executing the instructions to cause the communication apparatus to:
      provide a user interface used for a remote operation via a network;
      obtain, in accordance with a predetermined operation, authentication information stored in the storage to log in to the LDAP server, when the storage has stored the authentication information for the LDAP server and the provided user interface is not used for the predetermined operation;
      perform control to log in to the LDAP server by using the obtained authentication information;
      obtain information from the LDAP server after the control is performed;
      request, to log in to the LDAP server, an input of authentication information via the user interface when a remote operation is accepted using the user interface; and
      perform control to log in to the LDAP server by using the input authentication information without the authentication information stored in the storage.

2. The communication apparatus according to claim 1, wherein the instructions further cause the communication apparatus to register the information obtained from the LDAP server in an address book stored in the storage.

3. The communication apparatus according to claim 1, further comprising a scanner for reading an original to generate image data,
   wherein the instructions further cause the communication apparatus to transmit the generated image data using the information obtained from the LDAP server.

4. A method of controlling a communication apparatus that includes a storage and communicates with an LDAP (Lightweight Directory Access Protocol) server, wherein the LDAP server is arranged within an intranet, the method comprising:
   providing a user interface used for a remote operation via a network;
   obtaining, in accordance with a predetermined operation, authentication information stored in the storage to log in to the LDAP server, when the storage has stored the authentication information for the LDAP server and the provided user interface is not used for the predetermined operation;
   performing control to log in to the LDAP server by using the obtained authentication information;

obtaining information from the LDAP server, after the control is performed;

requesting, to log in to the LDAP server, an input of authentication information via the user interface when a remote operation is accepted using the user interface; and performing control to log in to the LDAP server by using the input authentication information without the authentication information stored in the storage.

5. A non-transitory computer-readable storage medium storing a computer program for causing a computer to execute a method of controlling a communication apparatus that includes a storage and communicates with an LDAP (Lightweight Directory Access Protocol) server, wherein the LDAP server is arranged within an intranet, the method comprising:

providing a user interface used for a remote operation via a network;

obtaining, in accordance with a predetermined operation, authentication information stored in the storage to log in to the LDAP server, when the storage has stored the authentication information for the LDAP server and the provided user interface is not used for the predetermined operation;

performing control to log in to the LDAP server by using the obtained authentication information;

obtaining information from the LDAP server, after the control is performed;

requesting, to log in to the LDAP server, an input of authentication information via the user interface when a remote operation is accepted using the user interface; and performing control to log in to the LDAP server by using the input authentication information without the authentication information stored in the storage.

6. A communication apparatus communicating with an LDAP (Lightweight Directory Access Protocol) server, wherein the LDAP server is arranged within an intranet, comprising:

a storage;

a local operation device;

a memory storing instructions, and at least one processor for executing the instructions to cause the communication apparatus to:

provide a user interface used for a remote operation via a network;

obtain, for a local operation using the local operation device, authentication information stored in the storage to log in to the LDAP server, when the storage has stored the authentication information for the LDAP server;

perform control to log in to the LDAP server by using the obtained authentication information;

obtain information from the LDAP server after the control is performed;

request, to log in to the LDAP server, an input of authentication information via the user interface when a remote operation is accepted using the user interface; and perform control to log in to the LDAP server by using the input authentication information without the authentication information stored in the storage.

7. The communication apparatus according to claim 6, wherein the instructions further cause the communication apparatus to register the information obtained from the LDAP server in an address book stored in the storage.

8. The communication apparatus according to claim 6, further comprising a scanner for reading an original to generate image data, wherein the instructions further cause the communication apparatus to transmit the generated image data using the information obtained from the LDAP server.

9. A method of controlling a communication apparatus that includes a storage and a local operation device, and communicates with an LDAP (Lightweight Directory Access Protocol) server, wherein the LDAP server is arranged within an intranet, the method comprising:

providing a user interface used for a remote operation via a network;

obtaining, for a local operation using the local operation device, authentication information stored in the storage to log in to the LDAP server, when the storage has stored the authentication information for the LDAP server;

performing control to log in to the LDAP server by using the obtained authentication information;

obtaining information from the LDAP server, after the control is performed;

requesting, to log in to the LDAP server, an input of authentication information via the user interface when a remote operation is accepted using the user interface; and performing control to log in to the LDAP server by using the input authentication information without the authentication information stored in the storage.

10. The method according to claim 9, wherein the information obtained from the LDAP server is registered in an address book stored in the storage.

11. The method according to claim 9, wherein the communication apparatus further includes a scanner for reading an original to generate image data, and wherein the generated image data is transmitted using the information obtained from the LDAP server.

* * * * *